Nov. 11, 1969  B. G. HURD  3,477,508
METHOD OF MAXIMIZING EFFICACY OF SURFACTANT IN FLOODING WATER
Filed Oct. 9, 1967

INVENTOR
BILLY G. HURD
Frederick E. Dumoulin
ATTORNEY

United States Patent Office 3,477,508
Patented Nov. 11, 1969

3,477,508
METHOD OF MAXIMIZING EFFICACY OF SURFACTANT IN FLOODING WATER
Billy G. Hurd, Dallas, Tex., assignor to Mobil Oil Corporation, a corporation of New York
Filed Oct. 9, 1967, Ser. No. 673,883
Int. Cl. E21b 43/22, 49/00
U.S. Cl. 166—250                           11 Claims

ABSTRACT OF THE DISCLOSURE

This specification discloses a method of waterflooding a subterranean formation containing oil and saline water to recover the oil. The mtehod comprises injecting into the formation through injection means a slug of an aqueous solution of surfactant having a salinity which is not more than one-half that of the saline water contained in the formation being flooded to minimize adsorption of the surfactant onto the matrix of the subterranean formation. Thereafter, by injecting water behind the aqueous solution of surfactant, the solution and displaced oil are driven toward production means where the oil is produced to the surface of the earth.

BACKGROUND OF THE INVENTION

This invention pertains to recovery of petroleum from a subterranean formation. More particularly, this invention pertains to recovering petroleum from a subterranean formation by waterflooding.

The petroleum, more commonly called crude oil or simply oil, accumulated in subterranean formations is recovered or produced therefrom through wells drilled into the subterranean formations. A large amount of oil is left in a subterranean formation if produced only by primary depletion, i.e., where only initial formation energy is used to recover the oil. Where the initial formation energy is inadequate or has become depleted, supplemental operations are employed. The supplemental operations are often referred to as secondary recovery operations although, in fact, they may be primary or tertiary in sequence of their employment.

In the most successful and most widely used of these supplemental operations, a fluid is injected through injection means, comprising one or more wells, and passed into the formation. Oil is displaced within and is moved through the formation. It is produced from production means, comprising one or more wells, as the injected fluid passes from the injection means toward the production means. In a particular recovery operation of this sort, water is employed as the injected fluid and the operation is referred to as a waterflood. The injected water is referred to as the flooding water, as distinguished from the water contained in the formation, i.e., the in situ, or connate, water.

Waterflooding is a very useful method of supplementing recovery of oil from subterranean formations. It has, however, a relatively poor microscopic displacement efficiency. The microscopic displacement efficiency may be defined as the ratio of the amount of oil displaced from the pore space of the portion of the formation through which the water has passed to the original amount of oil therein. Surfactants have been suggested in the past for improving this microscopic displacement efficiency. Employing adequate surfactant to enhance the recovery of oil from the subterranean formation by the flooding water has not been economically or technically feasible heretofore because the surfactants are strongly adsorbed onto the surfaces of the subterranean formation.

SUMMARY OF THE INVENTION

The invention provides an improvement in a method of recovering oil from a subterranean formation containing oil and saline water and having injection means and production means completed therein, wherein flooding water is injected through the injection means to displace the oil within the subterranean formation toward the production means, and oil is produced to the surface of the earth through the production means. The improvement comprises injecting through the injection means and into the subterranean formation a slug of aqueous solution of surfactant which has had its salinity adjusted to a value which is less than one-half that of the salinity of the saline water contained in the formation being flooded. The slug of aqueous solution of surfactant contains sufficient surfactant that the interfacial tension between the flooding water and the oil contained in the formation is below about 0.1 dyne per centimeter. It is preferred to prepare the surfactant solution from water native to the formation diluted to less than one-half its initial salinity. By "salinity," reference is being made to sodium chloride content.

DESCRIPTION OF SPECIFIC EMBODIMENTS

Figure 1A:
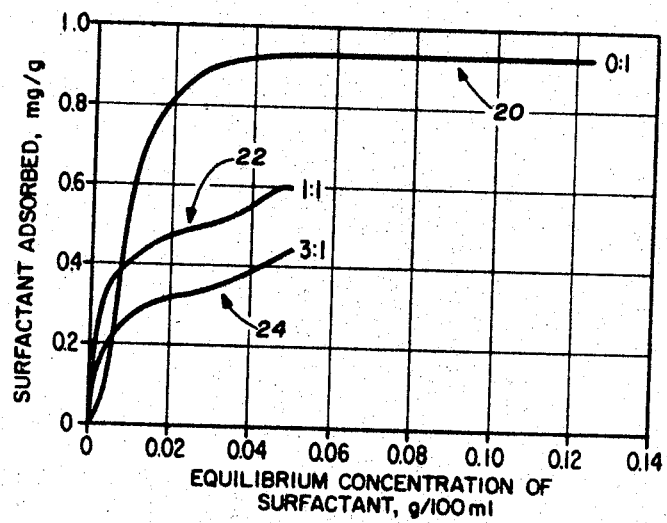
FIGURES 1a and 1b are graphs showing adsorption isotherms for a surfactant from formation brines diluted with fresh waters in varying proportions.

Any surfactant which will effect an interfacial tension between the flooding water and the oil being displaced within the subterranean formation can be employed. Preferably, the surfactant should reduce the interfacial tension to less than about 0.1 dyne per centimeter. Illustrative of suitable surfactants are the alkyl aryl poly(ethoxy)ethanols in which the alkyl aryl groups impart an oil solubility slightly greater than the water solubility imparted by the poly(ethoxy)ethanol groups. Satisfactory surfactants from this group include octyl or nonyl phenol having 4 to 6 ethoxy groups in the poly(ethoxy) group. Other suitable surfactants include the long chain alkyl sulfonates and the alkyl aryl sulfonates. Preferred surfactants are mixtures of petroleum sulfonates having a median molecular wegiht of from about 375 to about 430, having molecular weights between 290 and 590, no more than 10 percent by weight having an average molecular weight less than 290, and no more than 15 percent by weight having an average molecular weight greater than 590. Hereinafter, the petroleum sulfonates described above are referred to by the term "the restricted petroleum sulfonates." Particularly preferred surfactants are petroleum sulfonates having a median molecular weight of from about 400 to about 430 and otherwise having the molecular weight distribution of the restricted petroleum sulfonates outlined above. These particularly preferred petroleum sulfonates are referred to hereinafter as "the preferred restricted petroleum sulfonates."

The molecular weights referred to above and hereinafter are the molecular weights of the sodium salts of the petroleum sulfonates. Moreover, the term "molecular weight" should be understood to mean equivalent weight, which is defined as molecular weight per sulfonate group. The term "molecular weight" is used because it is commonly applied by manufacturers of petroleum sulfonates in describing their products.

The surfactant can be employed in any amount. Generally, the greater the amount employed up to a given concentration which varies depending upon the surfactant, the greater will be the reduction in interfacial tension. Ordinarily, a concentration of surfactant of from about 0.01 percent by weight to about 25 percent by weight is adequate. Preferably, if the surfactant is capable of effecting such a reduction in interfacial tension, it should be employed in an amount sufficient to reduce the interfacial tension between the surfactant solution and the oil to below 0.1 dyne per centimeter. Still more preferably, it should be employed in an amount which will effect an interfacial tension of from about 0.01 to about 0.001 dyne per centimeter, or less.

When the restricted petroleum sulfonates or the preferred restricted petroleum sulfonates are employed as the surfactant, the lowest interfacial tensions are effected between the surfactant solution and the oil being displaced within the formation by a concentration of surfactant within the formation of from about 0.01 to about 0.5 percent by weight of the surfactant solution. However, mixtures of petroleum sulfonates are subject to chromatographic dispersion in subterranean formations with the higher molecular weight sulfonates being adsorbed preferentially to the lower molecular weight sulfonates.

Because of the chromatographic dispersion of the higher molecular weight petroleum sulfonates, it is preferred that the initial portion of the slug of surfactant solution must contain a concentration of petroleum sulfonates higher than 0.5 percent by weight to effect the desired concentration of the higher molecular weight petroleum sulfonates in the trailing edge of the slug. Thus, ordinarily, the initial portion of the slug of surfactant solution will contain a concentration of from about 1 to about 5 percent by weight of the petroleum sulfonates, of the restricted petroleum sulfonates, or of the higher molecular weight components thereof. Even higher concentrations of petroleum sulfonates are beneficial and improve the recovery of oil. However, the higher concentrations are more expensive and are not generally economically feasible.

A slug of surfactant solution from about 0.01 to about 0.2 pore volume will be most economically advantageous. A greater volume of surfactant solution may be employed. Ordinarily, however, the additional oil recovered by employing a greater volume is worth less than the extra cost of the additional surfactant.

Subterranean formations often contain brines of high salinity, for example, containing about 4 percent or higher by weight of salt. Generally, the flooding water available in the area of such a formation will be composed of these high-salinity brines. Often these brines contain appreciable concentration of divalent cations, principally calcium and magnesium ions. Many surfactants, particularly the alkyl aryl poly(ethoxy)ethanols and the petroleum sulfonates are chemically incompatible with brines having sodium chloride concentrations in excess of about 2 percent by weight and are chemically incompatible with all brines containing appreciable concentration of divalent cations.

To prevent any adverse reactions between the slug of surfactant solution and brines within the subterranean formation, a slug of about 0.01 to about 0.2 pore volume, inclusive of aqueous buffer liquid having about the same salinity as the slug of surfactant solution to be employed and specifically containing less than 2 percent by weight of sodium chloride is injected through the injection means and into the subterranean formation ahead of the slug of surfactant solution. The aqueous buffer liquid miscibly displaces the concentrated brine, leaving an environment with which the surfactant solution is chemically compatible.

In cases where the flooding water which is injected behind the slug of surfactant solution through the injection well and into the subterranean formation is concentrated brine, a slug of from about 0.01 to about 0.2 pore volume, inclusive, of aqueous buffer liquid is injected through the injection means and into the subterranean formation behind the slug of surfactant solution and in front of the flooding water. Again, such a slug of buffer liquid prevents the concentrated brine comprising the flooding water from intermingling with and producing adverse chemical reactions with the surfactant solution.

The procedure of waterflooding for the recovery of oil is well known and further description herein of the injection of the flooding water is not believed necessary. Conventional equipment, such as wells, mixing tanks, pumps, and piping, which is ordinarily employed in waterflooding operations may be employed in the practice of this invention. Furthermore, the production equipment, such as water knockouts, emulsion breakers, oil and gas separators, liquid level controls, backpressure controls, piping, storage tanks, and custody transfer equipment, may be employed conventionally in carrying out this invention.

From an engineering point of view, it may be desirable to tailor the salinity of the slug of surfactant solution to the particular reservoir.

In tailoring the salinity of the surfactant solution to that which is optimum for the individual subterranean formation having injection means and production means completed therein, a specific embodiment of the invention comprises the following steps: (1) determine by tests on the subterranean formation, or samples thereof, the optimum salinity of an aqueous surfactant solution containing surfactant which minimizes or affords the least adsorption of surfactant yet maintains a rate of injection into the formation which is acceptably high and effects an interfacial tension between the surfactant solution and the in situ oil which is acceptably low; (2) prepare water having the optimum salinity, admix with surfactant to form a slug of surfactant solution having this optimum salinity, and inject the slug of surfactant solution through an injection well into the subterranean formation until the desired volume of surfactant solution has been injected into the oil-containing subterranean formation; (3) inject flooding water through the injection well and into the subterranean formation; and (4) produce oil from the subterranean formation to the surface of the earth through a producing well.

Once the optimum water salinity in step (1) has been determined, slugs of water having this salinity may be injected ahead of the surfactant slug to keep the salt concentration in the slug at this optimum salinity. Further, a slug of water having this optimum salinity may be injected immediately behind the slug of surfactant solution to prevent an increase in salt concentration at the rear of the slug of surfactant solution.

The salinity which is optimum for the surfactant solution in the subterranean formation can be determined by tests carried out on samples of the subterranean formation. Any samples of the subterranean formation may be employed. The testing may be in situ or on samples brought to the surface. Samples brought to the surface are usually obtained as core samples when the well is being drilled or following the completion of the well. For that reason, the samples of the subterranean formation will be referred to herein as core samples. Desirably the core samples are tested in their aggregated state. When testing an aggregated core sample, the core sample is placed in a rubber-sleeved cell and a sleeve pressure applied to prevent flow around the core sample. Sometimes it is necessary to employ a disaggregated sample of the subterranean formation. In these instances, the sample is packed into an inert container and the optimum salinity is determined as described hereinafter.

A static system may be employed to determine the optimum salinity. In the static system, the sample of the subterranean formation is submerged in the surfactant solution having a given salinity. The adsorption of surfactant for a given volume of the sample of the subterranean formation is determined by one of two procedures. In the first, the amount of the surfactant which is added to maintain a given concentration thereof in the surfactant solution surrounding the sample is measured as the determination of the adsorption of surfactant at the given concentration. In the second, the depletion of the surfactant from the surfactant solution, as indicated by the decreasing concentration of surfactant therein, may be used as the determination of the adsorption of surfactant at the final equilibrium concentration thereof.

Alternatively, a dynamic system may be employed to determine the optimum salinity. In the dynamic system, the surfactant solution containing a given concentration of surfactant is flowed into the sample of the subterranean formation. The concentration of surfactant in the effluent is measured and flow is continued until the effluent concentration is essentially the same as the inlet concentration. The amount of the surfactant adsorbed is determined by integrating the difference between the inlet concentration curve and the effluent concentration curve over the volume of surfactant solution which has been flowed through the sample of the subterranean formation.

It is conventional engineering practice to investigate behavior of a fluid which is to be injected into a subterranean formation to recover oil therefrom. Accordingly, the concentration of surfactant within the ranges described hereinbefore may have been determined by conventional reservoir engineering analyses of the surfactant, samples of the subterranean formation, and oil from the subterranean formation.

Employing this concentration of surfactant, surfactant solutions of various salinities will be flowed through core samples incorporated into the above-described laboratory model, having a controlled pressure drop thereacross or a controlled rate of flow therethrough. The adsorption of the surfactant from these solution may be determined by concentration analyses on the effluent from the core samples. The analyses of the effluent from the core sample monitors the concentration of surfactant. The concentration of surfactant is an inverse indication of the amount of adsorption being experienced in the core sample. The salinity affording the highest concentration of surfactant in the effluent from the core sample is the salinity which effects the least adsorption. Further, if the laboratory model has a controlled pressure drop thereacross, the flow rate obtainable affords an indication of any restriction inpermeability caused by diminishing salinity compared to the salinity of the brine native to the formation. Conversely, where a controlled rate of flow through the core sample is employed, the pressure drop thereacross affords an indication of any restriction in permeability caused by flowing surfactant solution having a lower salinity through the core sample. This restriction of permeability upon contact with less-saline water is discussed hereinafter.

In the event that static systems are employed in determining adsorption isotherms, primarily two techniques are used. In one technique, solutions containing the same initial surfactant concentrations are equilibrated with sample of the subterranean formation and the ratio of the amount of solution to the amount of the sample is varied to reach different equilibrium concentrations of surfactant in the solution. In the second technique, the initial surfactant solution concentration is varied while maintaining the same solution-to-sample ratio to reach different equilibrium concentrations. In practice, the second technique is more convenient, particularly if competitive adsorption between two or more solutes is involved. A test commonly employed to determine whether or not adsorption equilibrium has been established is to employ both techniques. If data points obtained by each technique fall on the same isotherm, adsorption equilibrium is considered to have been established.

Ordinarily, the lesser the salinity of the slug of surfactant solution, the lesser will be the adsorption of surfactant.

The permeability of many subterranean formations is reduced by contact with fresh water, defined as water having a very low salinity. This is understood to be due to the presence in the formation of clays which swell and disperse on contact with water having some degree of lesser salinity than the in situ water. Unfortunately, the formations which have a high proportion of clays are also those formations which present the most serious problem of adsorption of surfactant from surfactant solution. Nevertheless, for any given formation there is a compromise in salinity which will substantially improve waterflooding with surfactant without reducing the permeability below an acceptable level. Expressed otherwise, salinity can usually be reduced without plugging the formation or restricting the permeability to an unacceptable level. Such reduction of salinity will also be effective in reducing the surfactant adsorption. Where the salinity of the slug of surfactant solution is one-half that of the native water, the permeability or rate if injection is not intolerably restricted.

An acceptable rate of injection is a volume rate of injection which will afford a frontal movement of the waterflood througfh the oil-containing subterranean formation of at least 0.1 foot per day. Ordinarily, an injection rate which will afford a frontal movement of 0.5 to 2.0 feet per day, or more, is preferred. Hence, the salinity should not be reduced below the salinity which allows an injection rate sufficient to effect frontal movement of at least 0.1 foot per day, and preferably from about 0.5 to about 2.0 feet per day. Further, the salinity should not be reduced below that value which effects an increase in injection pressure of more than double the injection pressure that would effect the desired injection rate with water having salinity of that of the native water. The injection pressure employed, regardless, should not be so high as to fracture the subterranean formation.

The interfacial tension between the in situ oil and the surfactant solution displacing it within the subterranean formation is increased by reducing the salinity of the surfactant solution. When the salinity of the surfactant solution is reduced, the interfacial activity of the surfactant is reduced since it is more soluble in the less-saline water. Thus, the increase in the interfacial tension effected by the reduction in salinity results in an adverse effect on release of the oil trapped in the interstices of the formation since the microscopic displacement of the oil is improved with lowering of the interfacial tension. Again, for any given formation there is a salinity above which adsorption will be significantly reduced, yet the interfacial tensions will remain low enough to recover most of the oil by the flooding water. Here, also, salinities one-half that of the brine native to the formation will not intolerably increase the interfacial tension.

The salinity should not be reduced below the salinity at which the surfactant will effect an interfacial tension between the flooding water and the in situ oil of at least 0.1 dyne per centimeter. If the adsorption of the surfactant from the flooding water can be reduced enough to make the flooding operation economically successful, it is preferable to keep the salinity above that at which the surfactant effects an interfacial tension of from 0.01 to 0.001, or less.

With respect to the three variables, amount of surfactant adsorbed, rate of injection, and interfacial tension, there will be a compromise which is optimum for each particular subterranean formation.

Example 1

Figure 1B:
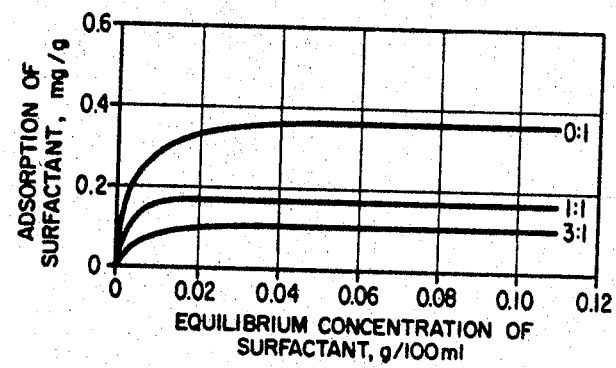

This example illustrates the decreased adsorption of surfactant obtained with less-saline solutions. Static and dynamic adsorption tests were made at 25° C. on disaggregated core samples of the Loma Novia Sand, Loma Novia Field, Duval County, Tex. The surfactant employed was Alconate 80, a synthetic petroleum sulfonate mixture having an average molecular weight of about 420 and having molecular weights as high as 590. Solutions containing various concentrations of Alconate 80 were equilibrated with the core samples and the final equilibrium solution concentrations determined. The depletion of Alconate 80 concentration in the solution affords a measure of the adsorption of Alconate 80 at that concentration. FIGURE 1a shows the data plotted in graphical form. The ordinate is the Alconate 80 adsorbed in milligrams per gram of solid core material. The abscissa is the equilibrium concentration of Alconate 80 in grams per 100 millimeters in the final solution. Curve 20 shows the adsorption of Alconate 80 from the undiluted brine native to the Loma Novia Sand. This Loma Novia brine contained naturally about 1.2 percent by weight sodium chloride and a minor amount of other dissolved solids, and there had been added to it 0.05 percent by weight of sodium carbonate and 0.1 percent by weight of sodium tripolyphosphate. Curve 22 is an isotherm showing the adsorption of Alconate 80 from a solution formed by diluting the Loma Novia brine 1:1 with substantially fresh water. Similarly, curve 24 is an isotherm showing the adsorption of Alconate 80 from a solution formed by diluting each volume of the native brine with three volumes of fresh water from the aquifier. The diluted brine solutions also contained 0.05 percent by weight of sodium carbonate and 0.1 percent by weight of sodium tripolyphosphate. Not only is the adsorption of the surfactant from the flooding water reduced by the successively less-saline solutions, but also the initial slopes of the isotherms are generally reduced by reducing the salinity of the water, shown more clearly in FIGURE 1b, for example. The curves in FIGURE 1 were obtained from Loma Novia Sand from which part of the clays and silt had been removed giving it a lower specific surface. The initial slopes are often taken as an indication of the strength and tenacity of adsorption and hence are of significance if a sorption-desorption chromatographic type of transport must be relied upon to achieve the desired minimum concentration of surfactant throughout a major portion of the reservoir. Such a type of transport usually must be relied upon in employing surfactants in waterflooding since it is rarely economically feasible to inject enough surfactant to satisfy completely the adsorptive capacity of the reservoir.

Example 2

This example illustrates both the decreased adsorption of surfactant and the improved chromatographic transport whereby a concentration of surfactant above the minimum required can be maintained in the front of the advancing flooding water.

A Lucite tube one inch in diameter by twelve inches long was packed with disassociated core material from the Loma Novia Sand mentioned previously. The pack was saturated with the undiluted Loma Novia brine and the following solutions were successfully injected:

(1) 0.1 pore volume of 3.0 percent by weight of sodium carbonate in Loma Novia brine, (2) 0.03 pore volume of 0.10 percent by weight of sodium carbonate and 0.1 percent by weight of sodium tripolyphosphate (STP) in Loma Nova brine, (3) 0.1 pore volume of the surfactant solution, which was a 1.17 percent by weight solution of Alconate 80 in Loma Novia brine to which 0.10 percent by weight of sodium carbonate and 0.1 percent by weight of sodium tripolyphosphate had been added, (4) 0.03 pore volume of 0.10 percent by weight of sodium carbonate and 0.1 percent by weight of sodium tripolyphosphate in Loma Nova brine, and (5) continuous injection of 0.1 percent by weight of sodium carbonate in Loma Novia brine to displace the surfactant solution through the pack.

The preflush of sodium carbonate solution to satisfy the alkali demand or neutralize acidic sites on the solid surface and the addition of the sodium carbonate and the sodium tripolyphosphate in the amounts indicated reduce the adsorption of Alconate 80 on the formation solids.

Figure 2:
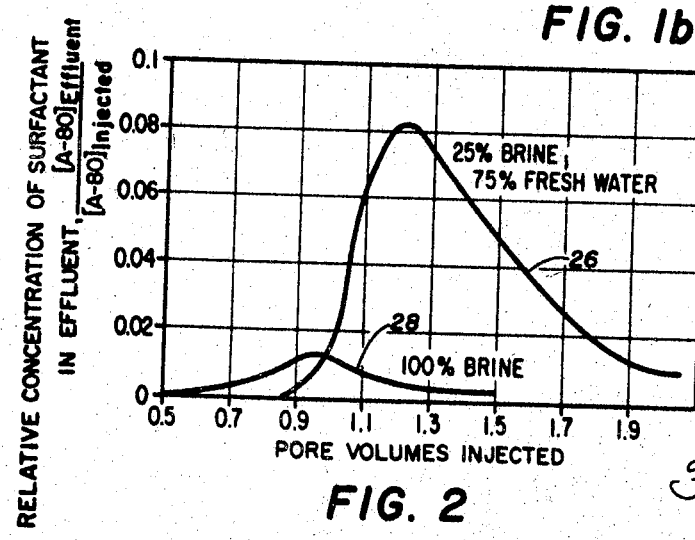
FIGURE 2 is a graph showing the improved transport of surfactant through porous media by brine diluted with fresh water compared to brine alone.

The procedure was repeated except that, after saturating an essentially identical pack with the Loma Novia brine, the injection and displacing solutions were prepared from a diluted brine which consisted of 25 percent by volume of Loma Novia brine and 75 percent by volume of distilled water. In both tests, the concentration of Alconate 80 in the effluent fractions was monitored. The data from the tests are summarized in FIGURE 2. In FIGURE 2, curve 26 represents the relative effluent concentration of surfactant obtained with the solution consisting of 75 percent of distilled water and only 25 percent of Loma Novia brine, compared to curve 28 showing the relative effluent concentration of surfactant in Loma Novia brine.

What is claimed is:

1. In a method of recovering oil from a subterranean formation containing oil and brine and having at least one injection well and at least one production well, wherein a solution of surfactant and flooding water are injected through an injection well to displace said oil within said formation, the improvement comprising the steps of:

(a) determining the optimum salinity, less than one-half the salinity of said brine, of a solution of surfactant, said solution containing a concentration of said surfactant sufficient to afford an interfacial tension between said solution and said oil of less than 0.1 dyne per centimeter, which minimizes absorption of said surfactant onto the surfaces of a sample of said formation without reducing the rate of injection of said solution into said sample below, or increasing said interfacial tension between said solution and said oil from said formation above, acceptable values, (b) preparing water having said optimum salinity and admixing therewith said surfactant in said concentration to form a surfactant solution having said optimum salinity and an interfacial tension between said soltuion and said oil of less than 0.1 dyne per centimeter, (c) injecting a slug of said surfactant solution through said injection well and into said formation, (d) injecting flooding water through said injection well and into said formation, and (e) recovering oil from said formation.

2. The method of claim 1 wherein said surfactant solution is prepared by taking said brine from said formation and diluting it with fresher water to reduce its salinity to less than one-half its initial salinity and dissolving sufficient surfactant therein to effect an interfacial tension between said oil and said surfactant solution of less than about 0.1 dyne per centimeter.

3. The method of claim 1 wherein a slug of from about 0.01 to about 0.2 pore volume, inclusive, of buffer liquid having about the same salinity as said surfactant solution and containing less than 2.0 percent by weight of sodium chloride is injected through said injection well and into said formation ahead of said surfactant solution.

4. The method of claim 1 wherein a slug of from about 0.01 to about 0.2 pore volume, inclusive, of buffer liquid is injected through said injection well and into said formation behind said surfactant solution and in front of said flooding water injected behind said surfactant solution, said buffer liquid having about the same salinity as said surfactant solution and containing less than 2.0 percent by weight sodium chloride.

5. The method of claim 3 wherein said slug of said buffer liquid is also injected behind said surfactant solution through said injection well and into said formation.

6. The method of claim 1 wherein said surfactant is a mixture of petroleum sulfonates having a median molecular weight of from about 375 to about 430, having molecular weights between 290 and 590, no more than 10 percent by weight having an average molecular weight less than 290, and no more than 15 percent by weight having an average molecular weight greater than 590.

7. The method of claim 6 wherein said petroleum sulfonates have a median molecular weight of from about 400 to about 430.

8. The method of claim 6 wherein said surfactant is in a concentration of from about 0.01 to about 25 percent by weight of said surfactant solution.

9. The method of claim 1 wherein step (a) comprises:
   (a) measuring absorption isotherms of surfactant from solutions containing said concentration of surfactant and having different salinities by a static system in which the decrease in surfactant concentration in the respective solutions surrounding said sample affords a measure of the adsorption of surfactant,
   (b) physically measuring said interfacial tension between said water containing said surfactant and a given salinity and said oil, and
   (c) delineating as said optimum salinity the minimum salinity which affords the highest concentration of surfactant in said solution about said sample, which affords a rate of injection into said sample which will scale up in a commercial application to a frontal movement of at least 0.5 foot per day, and which does not increase interfacial tension between said water containing said surfactant and said oil to more than 0.1 dyne per centimeter.

10. The method of claim 1 wherein step (a) comprises:
    (a) injecting in a series of runs said concentration of surfactant in waters having different salinities into core samples and chemically measuring the concentration of said surfactant in the effluent water from each run through each of said core samples,
    (b) physically measuring the rates of flow through said core samples at a given pressure drop across said core samples,
    (c) physically measuring said interfacial tension between said water containing said surfactant and said oil for each run, and
    (d) delineating as said optimum salinity the minimum salinity which affords the highest concentration of surfactant in said effluent water from said core sample, which affords a rate of injection which will scale up in a commercial application to a frontal movement of at least 0.5 foot per day and which does not increase interfacial tension between said water containing said surfactant and said oil to more than 0.1 dyne per centimeter.

11. The method of claim 1 wherein step (a) comprises:
    (a) injecting in a series of runs said concentration of surfactant in waters having different salinities into core samples and chemically measuring the concentration of said surfactant in the effluent water from each run through each of said core samples,
    (b) physically measuring the pressure drops through said core samples at a given rate of flow through said core samples,
    (c) physically measuring said interfacial tension between said water containing said surfactant and said oil for each run, and
    (d) delineating as said optimum salinity the minimum salinity which affords the highest concentration of surfactant in said effluent water from said core sample, which affords no more than twice the initial injection pressure and which does not increase interfacial tension between said water containing said surfactant and said oil to more than 0.1 dyne per centimeter.

References Cited

UNITED STATES PATENTS

| | | | |
|---|---|---|---|
| 2,800,962 | 7/1957 | Garst | 166—9 |
| 3,028,912 | 4/1962 | Berry et al. | 166—9 |
| 3,175,610 | 3/1965 | Osoba | 166—9 |
| 3,302,713 | 2/1967 | Ahearn et al. | 166—9 |
| 3,343,597 | 9/1967 | Gogarty et al. | 166—9 |
| 3,346,047 | 10/1967 | Townsend et al. | 166—9 |
| 3,348,611 | 10/1967 | Reisberg | 166—9 |
| 3,369,602 | 2/1968 | Fallgatter | 166—9 |

CHARLES E. O'CONNELL, Primary Examiner

I. A. CALVERT, Assistant Examiner

U.S. Cl. X.R.

166—273, 275

PO-1050
(5/69)

UNITED STATES PATENT OFFICE
CERTIFICATE OF CORRECTION

Patent No. 3,477,508     Dated November 11, 1969

Inventor(s) Billy G. Hurd

It is certified that error appears in the above-identified patent and that said Letters Patent are hereby corrected as shown below:

Column 1, line 15, "mtehod" should read --method--.
Column 2, line 48, "wegiht" should read --weight--.
Column 5, line 35, "solution" should read --solutions--.
Column 6, line 23, "througfh" should read --through--.
Column 7, line 4, "samples" should read --sample--;
        line 25, "aquifier" should read --aquifer--.

Column 8, line 30, "absorption" should read --adsorption--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents